(12) United States Patent
Ohguri et al.

(10) Patent No.: US 9,695,519 B2
(45) Date of Patent: Jul. 4, 2017

(54) POSITIVE ELECTRODE CATALYST AND DEVICE

(71) Applicants: SANTOKU CORPORATION, Kobe-shi, Hyogo (JP); NATIONAL UNIVERSITY CORPORATION HOKKAIDO UNIVERSITY, Sapporo-shi, Hokkaido (JP)

(72) Inventors: Nobuaki Ohguri, Tokyo (JP); Hiroshi Takano, Ichihara (JP); Tadatoshi Murota, Kobe (JP); Motofumi Matsuda, Kobe (JP); Tatsuya Takeguchi, Sapporo (JP)

(73) Assignees: SANTOKU CORPORATION, Kobe-Shi, Hyogo (JP); NATIONAL UNIVERSITY CORPORATION HOKKAIDO UNIVERSITY, Sapporo-Shi, Hokkaido (JP)

( * ) Notice: Subject to any disclaimer, the term of this patent is extended or adjusted under 35 U.S.C. 154(b) by 0 days.

(21) Appl. No.: 14/763,932

(22) PCT Filed: Jan. 28, 2014

(86) PCT No.: PCT/JP2014/051788
§ 371 (c)(1),
(2) Date: Jul. 28, 2015

(87) PCT Pub. No.: WO2014/119549
PCT Pub. Date: Aug. 7, 2014

(65) Prior Publication Data
US 2015/0361567 A1    Dec. 17, 2015

(30) Foreign Application Priority Data
Jan. 30, 2013 (JP) .................. 2013-015336

(51) Int. Cl.
C25B 11/04 (2006.01)
H01M 12/08 (2006.01)
(Continued)

(52) U.S. Cl.
CPC ........... *C25B 11/0463* (2013.01); *B01J 23/78* (2013.01); *C25B 1/04* (2013.01); *C25B 11/0447* (2013.01);
(Continued)

(58) Field of Classification Search
CPC .. B01J 23/78; C25B 11/0447; C25B 11/0463; C25B 11/0473; C25B 1/04; H01M 12/08;
(Continued)

(56) References Cited

U.S. PATENT DOCUMENTS

2011/0143259 A1* 6/2011 Ueda .................. H01B 1/08
429/495
2013/0164638 A1    6/2013 Tanaami et al.

FOREIGN PATENT DOCUMENTS

JP    2002158013 A    5/2002
JP    2005190833 A    7/2005
(Continued)

OTHER PUBLICATIONS

Matsuda, M., et al. "The Effect of Layered Structures of Peroskite Oxide Catalyst on Activity for Oxygen-Reduction Reaction", Honolulu PRiME 2012, published Oct. 2012.*
(Continued)

*Primary Examiner* — Emily Le
*Assistant Examiner* — Lilia V Nedialkova
(74) *Attorney, Agent, or Firm* — Holtz, Holtz & Volek PC

(57) ABSTRACT

A positive electrode catalyst, for use in a positive electrode in a device provided with the positive electrode and a negative electrode, in which a reaction represented by $4OH^- \rightarrow O_2 + 2H_2O + 4e^-$ is performed on a side of the positive
(Continued)

electrode. The positive electrode catalyst includes a layered metal oxide, wherein the layered metal oxide is a Ruddlesden-Popper type layered perovskite represented by $(La_{1-x}A_x)(Fe_{1-y}B_y)_3(Sr_{1-z}C_z)_3O_{10-a}$ wherein, A is a rare earth element other than La, B is a transition metal other than Fe, and C is an alkaline earth metal other than Sr; and x satisfies an expression: $0 \leq x < 1$, y satisfies an expression: $0 \leq y < 1$, z satisfies an expression: $0 \leq z < 1$, and a satisfies an expression: $0 \leq a \leq 3$.

3 Claims, 4 Drawing Sheets

(51) Int. Cl.
*H01M 4/90* (2006.01)
*H01M 4/92* (2006.01)
*B01J 23/78* (2006.01)
*C25B 1/04* (2006.01)

(52) U.S. Cl.
CPC ....... *C25B 11/0473* (2013.01); *H01M 4/9016* (2013.01); *H01M 4/9033* (2013.01); *H01M 4/9041* (2013.01); *H01M 4/92* (2013.01); *H01M 12/08* (2013.01); *H01M 2220/10* (2013.01); *H01M 2220/20* (2013.01); *Y02E 60/366* (2013.01)

(58) Field of Classification Search
CPC ......... H01M 2220/10; H01M 2220/20; H01M 4/9016; H01M 4/9033; H01M 4/9041; H01M 4/92; Y02E 60/366
See application file for complete search history.

(56) References Cited

FOREIGN PATENT DOCUMENTS

| JP | 2012094281 A | 5/2012 |
|---|---|---|
| JP | 2013109867 A | 6/2013 |
| WO | 2012029743 A1 | 3/2012 |

OTHER PUBLICATIONS

Takahashi, H., et al. "Solid Alkaline Fuel Cell Composed of Layered Perovskite-Type Oxide LaSr3Fe3O10", ECS Transactions, vol. 35, pp. 267-272, published Oct. 11, 2011.*
International Search Report (ISR) dated Apr. 15, 2014 issued in International Application No. PCT/JP2014/051788.
Jung Kyu-Nam, et al., "Promoting Li2O2 oxidation by an La1.7Ca0.3Ni0.75Cu0.25O4 layered perovskite in lithium-oxygen batteries", Chem. Commu., Sep. 28, 2012, vol. 48, No. 75, pp. 9406-9408.
Suntivich, et al., "Design principles for oxygen-reduction activity on perovskite oxide catalysts for fuel cells and metal-air batteries", Nature Chemistry, vol. 3, 2011, pp. 546-550.
Tatsuya Takeguchi, et al., "Layered Perovskite Oxide: A Reversible Air Electrode for Oxygen Evolution/Reduction in Rechargeable Metal-Air Batteries", J. Am. Chem. Soc., Jun. 26, 2013, vol. 135, pp. 11125-11130.
McKerracher, et al., "A Review of the Iron-Air Secondary Battery for Energy Storage", ChemPlusChem, 2015, 80, 323-335.
Suntivich, et al., "A Perovskite Oxide Optimized for Oxygen Evolution Catalysis from Molecular Orbital Principles", Science, vol. 334, Dec. 9, 2011, 1383-1385.
Suntivich, et al., "Design Principles for Oxygen-Reduction Activity on Perovskite Oxide Catalysts for Fuel Cells and Metal-Air Batteries", Nature Chemistry, vol. 3, Jul. 2011, 546-550.

* cited by examiner

POSITIVE ELECTRODE CATALYST AND DEVICE

TECHNICAL FIELD

The present invention relates to a positive electrode catalyst used in a device such as a metal-air secondary battery and an alkaline water electrolysis apparatus, and a device provided with a positive electrode and a negative electrode.

BACKGROUND ART

Specific examples of a device provided with a positive electrode and a negative electrode, in which a reaction represented by the following formula (1) is performed on aside of the positive electrode, include a metal-air secondary battery and an alkaline water electrolysis apparatus.

$$4OH^- \rightarrow O_2 + 2H_2O + 4e^- \tag{1}$$

The metal-air secondary battery is a secondary battery in which a metal such as Zn, Li, Al and Fe is used as an active material at the negative electrode, and oxygen in air is used as an active material at the positive electrode. The metal-air secondary battery is small and can achieve high capacity, and expected in an application to power supply for an automobile, portable power supply, stationary power supply or the like.

A charge reaction and a discharge reaction in the metal-air secondary battery in which Zn is used at the negative electrode are represented as described below.

(Charge Reaction)
Positive electrode:

$$4OH^- \rightarrow O_2 + 2H_2O + 4e^-$$

Negative electrode:

$$ZnO + H_2O + 2e^- \rightarrow Zn + 2OH^-$$

(Discharge Reaction)
Positive electrode:

$$4OH^- \rightarrow O_2 + 2H_2O + 4e^-$$

Negative electrode:

$$Zn + 2OH^- \rightarrow ZnO + H_2O + 2e^-$$

Moreover, an electrode reaction in the alkaline water electrolysis apparatus is represented as described below.
Positive electrode:

$$4OH^- \rightarrow O_2 + 2H_2O + 4e^-$$

Negative electrode:

$$2H_2O + 2e^- \rightarrow H_2 2OH^-$$

However, the metal-air secondary battery has a problem of reduction of energy conversion efficiency caused by high reaction overpotential at the positive electrode during charging and discharging, and has not been extensively applied yet.

Moreover, the alkaline water electrolysis apparatus also faces a problem of large energy loss caused by the high reaction overpotential at the positive electrode.

Patent Literature 1 discloses an air electrode of a metal-air secondary battery, which is produced by mixing nickel powder on which iridium and/or an iridium oxide is supported, nickel powder on which an oxygen reduction catalyst such as platinum is supported, and a binder, and molding the resultant mixture.

Moreover, Non-Patent Literature 1 presents a report in which, if $LaNiO_3$ being one kind of perovskite oxide is used as a positive electrode catalyst, reaction overpotential during discharging can be reduced to 320 mV.

CITATION LIST

Patent Literature

[Patent Literature 1]: JP-A-2002-158013

Non-Patent Literature

[Non-Patent Literature 1]: Nature Chemistry, 3, (2011), pp. 546-550

SUMMARY OF INVENTION

Problems to be Solved by the Invention

However, in order to practically realize a metal-air secondary battery, further reduction of reaction overpotential at a positive electrode during charging and discharging is desired.

Moreover, also in an alkaline water electrolysis apparatus, in order to reduce energy loss, further reduction of the reaction overpotential at the positive electrode is desired.

Therefore, an objective of the present invention is to provide a positive electrode catalyst which is capable of reducing the reaction overpotential at the positive electrode, and a device capable of the same.

Means to Solve the Problems

The present inventors have diligently continued to conduct study, and as a result, have found that reaction overpotential at a positive electrode in a metal-air secondary battery during charging and discharging is reduced by using a layered metal oxide for a positive electrode catalyst, and have attained the objective described above.

More specifically, the positive electrode catalyst of the present invention is to be for a positive electrode in a device provided with the positive electrode and a negative electrode, in which a reaction represented by the following formula (1) is performed on a side of the positive electrode, and to have a feature in which the positive electrode catalyst contains the layered metal oxide.

Moreover, the device of the present invention is to contain a positive electrode and a negative electrode, in which the reaction represented by the following formula (1) is performed on a side of the positive electrode, and to have a feature in which the positive electrode is formed using a positive electrode catalyst containing a layered metal oxide.

$$4OH^- \rightarrow O_2 + 2H_2O + 4e^- \tag{1}$$

In the present invention, the layered metal oxide is preferably a Ruddlesden-Popper type layered perovskite.

In the present invention, the layered metal oxide is preferably a Ruddlesden-Popper type layered perovskite represented by the following formula (2).

$$(La_{1-x}A_x)(Fe_{1-y}B_y)_3(Sr_{1-z}C_z)_3O_{10-a} \tag{2}$$

(In the formula (2), A is a rare earth element other than La, B is a transition metal other than Fe, and C is an alkaline earth metal other than Sr; and x satisfies an expression: $0 \leq x < 1$, y satisfies an expression: $0 \leq y < 1$, z satisfies an expression: $0 \leq z < 1$, and a satisfies an expression $0 \leq a < 3$).

In the present invention, the device is preferably a metal-air secondary battery or an alkaline water electrolysis apparatus.

In the present invention, the device is preferably the metal-air secondary battery, and the negative electrode preferably contains a negative electrode active material containing an element selected from an alkaline metal, an alkaline earth metal, a first-row of transition metal and Al.

In the present invention, the device is preferably the alkaline water electrolysis apparatus, and the negative electrode preferably contains a negative electrode catalyst selected from Ni, Fe, Pt and Pd.

Advantageous Effects of Invention

A positive electrode catalyst of the present invention contains a layered metal oxide. Therefore, reaction overpotential in a reaction performed at a positive electrode and represented by the formula (1) described above can be reduced.

Moreover, in a device of the present invention, a positive electrode is formed using a positive electrode catalyst containing a layered metal oxide. Therefore, the device of the present invention can serve as a metal-air secondary battery having less overvoltage loss during charging and discharging and high energy conversion efficiency, or an alkaline water electrolysis apparatus having less energy loss.

DESCRIPTION OF EMBODIMENTS

Figure 1:
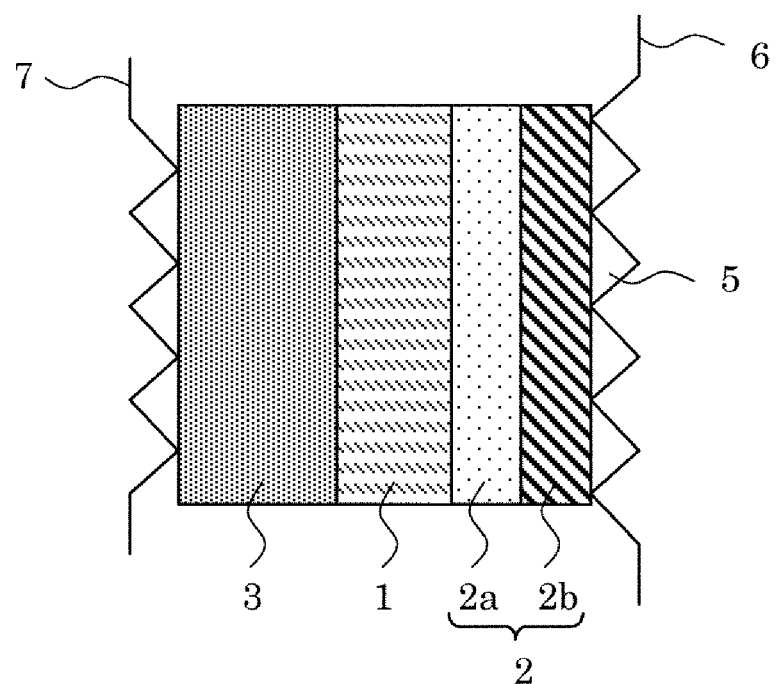
FIG. 1 is a schematic configuration diagram showing a metal-air secondary battery.

The positive electrode catalyst of the present invention is to be for a positive electrode in a device provided with the positive electrode and a negative electrode, in which a reaction represented by the following formula (1) is performed on a side of the positive electrode, and to have a feature in which the positive electrode catalyst contains the layered metal oxide:

$$4OH^- \rightarrow O_2 + 2H_2O + 4e^- \tag{1}$$

In the present invention, the layered metal oxide means a metal oxide having a crystal structure in which atoms or atomic groups are arranged on a plane surface to form a sheet structure, and repetition of the sheet structures is observed in a direction perpendicular to the plane surface.

In the present invention, as the layered metal oxide, $NaCo_2O_4$, $NaLaTiO_4$, $Bi_4Sr_{14}Fe_{24}O_{56}$, a Ruddlesden-Popper type layered perovskite or the like can be preferably used. Above all, the Ruddlesden-Popper type layered perovskite is preferred. The Ruddlesden-Popper type layered perovskite has a structure in which a perovskite layer and a rock salt structure layer are alternately stacked in a c-axis direction. One preferred example of the Ruddlesden-Popper type layered perovskite includes the following formula (2).

$$(La_{1-x}A_x)(Fe_{1-y}B_y)_3(Sr_{1-z}C_z)_3O_{10-a} \tag{2}$$

(In the formula (2), A is a rare earth element other than La, B is a transition metal other than Fe, and C is an alkaline earth metal other than Sr; and x satisfies an expression: $0 \leq x < 1$, y satisfies an expression: $0 \leq y < 1$, z satisfies an expression: $0 \leq z < 1$, and a satisfies and expression: $0 \leq a \leq 3$).

Specific examples of the Ruddlesden-Popper type layered perovskite represented by the formula (2) include $LaFe_3Sr_3O_{10}$ and $LaCo_{1.5}Fe_{1.5}Sr_3O_{1.0}$.

With regard to the Ruddlesden-Popper type layered perovskite, it is presumed that satisfactory catalytic activity can be obtained in the reaction represented by the formula (1) for the following reasons. One is presumed to be caused by high electron conductivity, and the other is presumed to be caused by easy occurrence of oxidation-reduction. The Ruddlesden-Popper type layered perovskite represented by the formula (2) has particularly high catalytic activity in the reaction represented by the formula (1) due to the high electron conductivity caused by stacked $FeO_6$ octahedrons inside a crystal lattice, and further due to easy occurrence of the oxidation-reduction.

$NaCo_2O_4$ can be prepared as described below, for example. First, a solution prepared by dissolving sodium acetate and cobalt acetate tetrahydrate at a predetermined ratio is dried, and the sample obtained is ground and subjected to temporary calcination. Next, the sample after the temporary calcination is ground, and then molded into a pellet shape. Then, the sample molded into the pellet shape is calcined at 750 to 850° C. for 120 to 3,000 minutes, and subjected to grinding treatment. Thus, $NaCo_2O_4$ having a layered crystal structure is obtained.

$NaLaTiO_4$ can be prepared as described below, for example. First, powder of raw materials such as an oxide and a carbonate of a Na component, a La component and a Ti component is charged into a ball mill to be 1:1:1 in an element ratio of Na, La and Ti, and subjected to mixing treatment until each component is sufficiently and uniformly mixed. Specific examples of the Na component include $Na_2CO_3$, $NaHCO_3$, $Na_2C_2O_4$ and $NaNO_3$. Specific examples of the La component include $La_2O_3$, $LaC_2$, $La_2(CO_3)_3$ and $La(NO_3)_3$. Specific examples of the Ti component include $TiO_2$, $TiO$ and $TiC$. Next, the sample obtained is molded into a pellet shape. Then, the sample molded into the pellet shape is calcined at 700 to 750° C. for 120 to 3,000 minutes (primary calcination), and subsequently calcined at 900 to 950° C. for 120 to 3,000 minutes (secondary calcination). Calcined pellets are subjected to grinding treatment, and then the resultant is washed with distilled water, and the washed sample is dried. Thus, $NaLaTiO_4$ having a layered crystal structure can be obtained.

$Bi_4Sr_{14}Fe_{24}O_{56}$ can be prepared as described below, for example. First, powder of raw materials such as an oxide and a carbonate of a Bi component, a Sr component and an Fe component is charged into a ball mill to be 4:14:24 in an element ratio of Bi, Sr and Fe, and subjected to mixing treatment until each component is sufficiently and uniformly mixed. Specific examples of the Bi component include $Bi_2O_3$, $Bi_2O_5$, $Bi(CH_3COO)_3$, $Bi_2(CO_3)O_2$ and $Bi(NO_3)_3$. Specific examples of the Sr component include $SrCO_3$, $SrC_2$, $SrO$, $SrO_2$ and $Sr(NO_3)_2$. Specific examples of the Fe component include $Fe_2O_3$, $Fe_3O_4$, $FeO$, $FeCO_3$ and $Fe_2(CO_3)_3$. Next, the sample obtained is molded into a pellet shape. Then, the sample molded into the pellet shape is calcined at 1,100 to 1,200° C. for 120 to 3,000 minutes, and then subjected to grinding treatment. Thus, $Bi_4Sr_{14}Fe_{24}O_{56}$ having a layered crystal structure is obtained.

The Ruddlesden-Popper type layered perovskite can be prepared by mixing powder of raw materials to be in a stoichiometric ratio of the Ruddlesden-Popper type layered perovskite and allowing a solid-phase reaction.

$LaFe_3Sr_3O_{10}$ can be prepared as described below, for example. First, powder of raw materials such as an oxide and a carbonate of a La component, a Sr component and an Fe component is charged into a ball mill to be 1:3:3 in an element ratio of La, Sr and Fe, and then subjected to mixing treatment until each component is sufficiently and uniformly mixed. As the La component, the Sr component and the Fe component, components identical with the components described above can be used. Next, the sample obtained is molded into a pellet shape. Then, the sample molded into the pellet shape is calcined at 1,400 to 1,500° C. for 120 to 3,000 minutes, and then subjected to grinding treatment. Thus, $LaFe_3Sr_3O_{10}$ having a layered crystal structure is obtained.

Moreover, $LaCo_{1.5}Fe_{1.5}Sr_3O_{1.0}$ can be prepared as described below. More specifically, powder of raw materials such as an oxide and a carbonate of a La component, a Sr component, an Fe component and a Co component is charged into a ball mill to be 1:3:1.5:1.5 in an element ratio of La, Sr, Fe and Co, and then subjected to mixing treatment until each component is sufficiently and uniformly mixed. As the La component, the Sr component and the Fe component, components identical with the components described above can be used. Specific examples of the Co component include $Co_3O_4$, $Co_2O_3$, $CoO$ and $CoCO_3$. Next, the sample obtained is molded into a pellet shape. Then, the sample molded into the pellet shape is calcined at a temperature of about 1,400 to 1,500° C. and subjected to grinding treatment. Thus, $LaCo_{1.5}Fe_{1.5}Sr_3O_{10}$ having a layered crystal structure is obtained.

The positive electrode catalyst of the present invention may contain a conductive material, an ion conductive material or the like in addition to the layered metal oxide. Specific examples of the conductive material include a metal such as Ni and Ti, and graphite. The electron conductivity of the positive electrode can be improved by incorporating the conductive material into the positive electrode catalyst. Specific examples of the ion conductive material include an anion exchange membrane and an alkaline aqueous solution of LiOH, KOH and NaOH. The ion conductivity of the positive electrode can be improved by incorporating the ion conductive material into the positive electrode catalyst.

Next, the device of the present invention is described.

The device of the present invention has a positive electrode and a negative electrode, in which the reaction represented by the formula (1) above is performed on a side of the positive electrode, and the positive electrode is formed using a positive electrode catalyst of the present invention.

Specific examples of the device in which the reaction represented by the formula (1) is performed on the side of the positive electrode include the metal-air secondary battery and the alkaline water electrolysis apparatus. The devices can be formed into a conventionally-known device structure except that the devices have the positive electrode formed using the positive electrode catalyst of the present invention.

One embodiment of the device of the present invention is described by using FIG. 1.

A device shown in FIG. 1 is a metal-air secondary battery. In the metal-air secondary battery, an electrolyte layer 1 is arranged between a positive electrode 2 and a negative electrode 3.

The electrolyte layer 1 is a layer that undertakes conduction of hydroxide ion ($OH^-$). Specific examples of the electrolyte layer 1 include an alkaline aqueous solution of LiOH, KOH and NaOH, and an anion exchange membrane.

The positive electrode 2 is composed of a positive electrode catalyst layer 2a formed of the positive electrode catalyst of the present invention, and a gas diffusion layer 2b formed of a porous sheet having conductivity, such as a carbon paper, a carbon cloth, a carbon felt and a metallic mesh. The positive electrode catalyst layer 2a is formed on a plane on a side of the electrolyte layer of the gas diffusion layer 2b.

The positive electrode catalyst layer 2a can be formed according to a conventionally-known method such as a slurry coating method, a spray coating method and a calcination method.

In an outside of the positive electrode 2, namely in the outside of the gas diffusion layer 2b, a current collector 6 on which a gas flow channel 5 is formed is arranged. A material of the current collector 6 may be one having conductivity, and is not particularly limited. Specific examples include stainless steel, nickel, aluminum, iron, titanium and carbon.

The negative electrode 3 is composed of a negative electrode layer that contains a negative electrode active material containing an element selected from an alkaline metal, an alkaline earth metal, a first-row of transition metal and aluminum. Specific examples of the alkaline metal include Li, Na and K. Specific examples of the alkaline earth metal include Mg and Ca. Specific examples of the first-row of transition metal include Zn, Fe, Ti, Ni, Co, Cu, Mn and Cr. Specific examples of the negative electrode active material include a metal formed of the element described above, an alloy containing the element described above and a compound containing the element described above. Specific examples of the compound include an oxide, a nitride or a carbonate of the element described above.

The negative electrode 3 may contain a conductive material, an ion conductive material or the like in addition to the negative electrode active material. As the conductive materials and the ion conductive materials, ones similar or identical to the materials described above can be used.

In an outside of the negative electrode 3, a current collector 7 is arranged. As materials of the current collector 7, ones similar or identical to the materials described above can be used.

The charge reaction and the discharge reaction in the metal-air secondary battery in which Zn is used at the negative electrode are represented as described below.

(Charge Reaction)
Positive electrode:

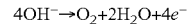
$$4OH^- \rightarrow O_2 + 2H_2O + 4e^-$$

Negative electrode:

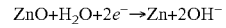
$$ZnO + H_2O + 2e^- \rightarrow Zn + 2OH^-$$

(Discharge Reaction)
Positive electrode:

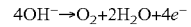
$$4OH^- \rightarrow O_2 + 2H_2O + 4e^-$$

Negative electrode:

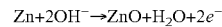
$$Zn + 2OH^- \rightarrow ZnO + H_2O + 2e^-$$

In the present invention, the reaction overpotential in the reaction to be performed at the positive electrode during charging and discharging can be reduced by using the layered metal oxide as the positive electrode catalyst, and the device can serve as the metal-air secondary battery having less overvoltage loss and high energy conversion efficiency.

Figure 2:
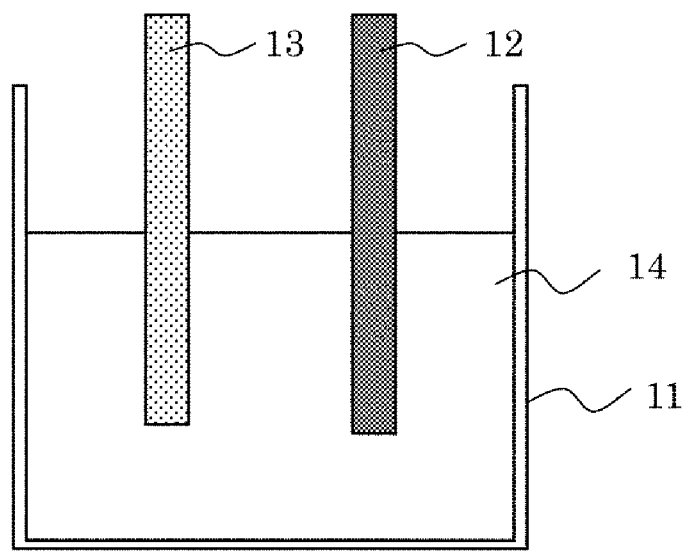
FIG. 2 is a schematic configuration diagram showing an alkaline water electrolysis apparatus.

The other embodiment of the device of the present invention is described by using FIG. 2.

A device shown in FIG. 2 is an alkaline water electrolysis apparatus. In the alkaline water electrolysis apparatus, a positive electrode 12 having the positive electrode catalyst of the present invention and a negative electrode 13 having the negative electrode catalyst such as Ni, Fe, Pt and Pd are arranged in an electrolytic cell 11 into which an electrolytic solution 14 such as LiOH, KOH and NaOH is introduced.

The positive electrode 12 and the negative electrode 13 can be formed according to a conventionally-known method such as a slurry coating method, a spray coating method and a calcination method.

In the alkaline water electrolysis apparatus, the reaction described below is performed at both electrodes by applying positive voltage to the positive electrode 12 and applying negative voltage to the negative electrode 13, and thus the electrolytic solution in the electrolytic-cell 11 is electrolyzed.

Positive electrode:

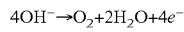

Negative electrode:

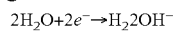

In the present invention, the reaction overpotential in the reaction to be performed at the positive electrode can be reduced by using the layered metal oxide as the positive electrode catalyst, and the device can serve as the alkaline water electrolysis apparatus having less energy loss.

In addition, examples of the metal-air secondary battery and the alkaline water electrolysis apparatus as the devices are shown in the examples described above. However, in a similar manner with regard to other devices, the reaction overpotential in the reaction to be performed at the positive electrode can be reduced by using the layered metal oxide as the positive electrode catalyst, and the devices can serve as ones having less energy loss.

EXAMPLES

Example 1

Figure 4:
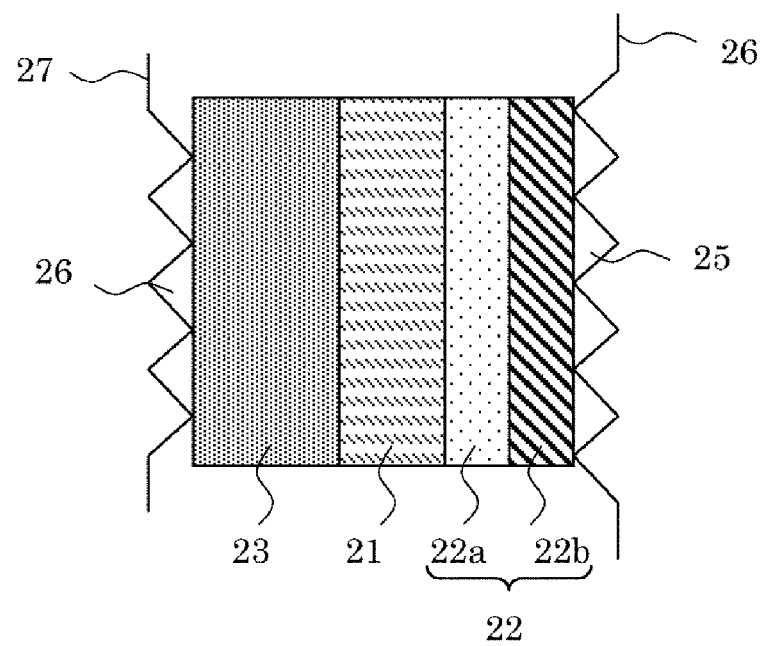
FIG. 4 is a schematic configuration diagram showing a model cell used in Example.

As a model cell of a metal-air secondary battery or an alkaline water electrolysis apparatus, a model cell having a structure shown in FIG. 4 was produced as described below.

$La_2O_3$ powder, $SrCO_3$ powder and $Fe_2O_3$ powder were charged into a ball mill to be 1:3:3 in an element ratio of La, Sr and Fe, and mixed therein. The resultant mixed powder was calcined at 1,400° C. for 2 hours to obtain $LaFe_3Sr_3O_{10}$ powder (positive electrode catalyst) being a Ruddlesden-Popper type layered perovskite. The powder obtained was ground, and then molded, at a pressure of 1 MPa by using a mold, into a disc shape having a diameter of 20 mm and a thickness of 0.5 mm. The disc-shaped molded body was calcined at a temperature of 1,000° C. for 3 hours to produce a $LaFe_3Sr_3O_{10}$ sintered body (positive electrode catalyst layer) 22a having a porosity of 30%.

The $LaFe_3Sr_3O_{10}$ sintered body 22a obtained was placed onto an electrolyte layer 21 prepared by impregnating a 6 M-KOH aqueous solution into a polypropylene microporous membrane, and a titanium mesh 22b was arranged thereon to serve the resultant as a positive electrode 22. On a side of the titanium mesh 22b of the positive electrode 22, a gas flow channel 25 made having a form of grooves by shaping stainless steel was arranged thereon. In addition, the gas flow channel 25 described above was used also in combined use as a collector plate 26.

On a side opposite across the electrolyte layer 21, a hydrogen electrode 23 in combined use as a counter electrode/reference electrode was arranged. The hydrogen electrode 23 was formed by applying a catalyst paste onto a carbon paper that was subjected to a water-repellent treatment with PTFE by a slurry coating method, where the catalyst paste was prepared by mixing 50 mass % of Pt/C and an anion conductive ion exchange resin to be 1:0.4 in a mass ratio and dispersing the resultant mixture with an ultrasonic wave for 10 minutes, to thereby make 0.3 mg/cm² in an amount of carrying Pt. On the hydrogen electrode 23 also, a gas flow channel 26 and a collector plate 27 were provided in a manner similar to the positive electrode 22, and the generated potential by passing hydrogen therethrough served as reference.

A model experiment of a charge and discharge reaction at a positive electrode was carried out by using this model cell.

Figure 3:
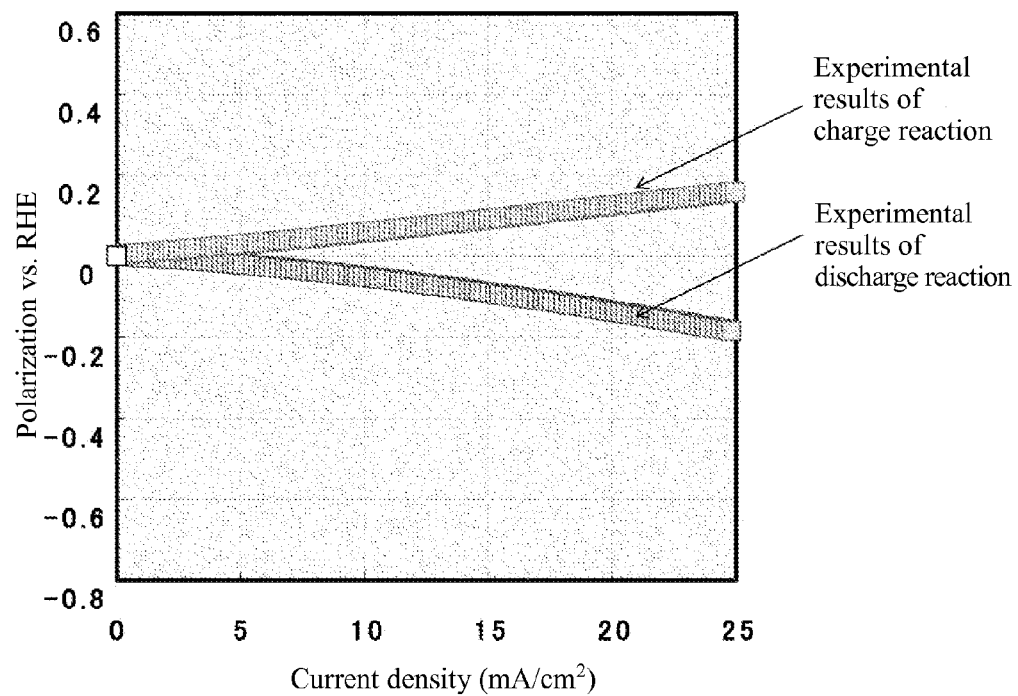
FIG. 3 is a diagram showing experimental results of a charging and discharge reaction at a positive electrode in a metal-air secondary battery in Example 1.

At a cell temperature of 60° C., a saturated humid $H_2$ gas was fed to the hydrogen electrode 23 at 50 mL/min, and a saturated humid $O_2$ gas was fed to the positive electrode 22 at 50 mL/min. A charge reaction test was conducted by measuring cell voltage by using a potentiostat upon scanning current in a + (plus) direction on the positive electrode 22 at 0.9 mA/s. A discharge reaction test was conducted by measuring cell voltage upon scanning current in a − (minus) direction on the positive electrode 22 at 0.9 mA/s. FIG. 3 shows experimental results of the charge and discharge reaction performed at the positive electrode when applying the present model cell. Based on positive electrode potential as the reference potential, polarization during charge at 10 mA/cm² was 0.06 V, and polarization during discharge at 10 mA/cm² was 0.05 V.

Comparative Example 1

A model cell was produced in the form of a structure identical with the structure in Example 1 except that $LaNiO_3$ being a perovskite oxide was used as a positive electrode catalyst. When a model experiment of a charge and discharge reaction was carried out in a manner similar to Example 1, based on positive electrode potential as reference potential, polarization during charging at 10 mA/cm² was 0.195 V, and polarization during discharging at 10 mA/cm² was 0.355 V.

EXPLANATION OF NUMERALS AND CHARACTERS

1: Electrolyte layer
2: Positive electrode
2a: Positive electrode catalyst layer
2b: Gas diffusion layer
3: Negative electrode
5: Gas flow channel
6, 7: Current collector
11: Electrolytic cell
12: Positive electrode
13: Negative electrode
14: Electrolytic solution

What is claimed is:

1. A device comprising a positive electrode and a negative electrode, the device being a metal-air secondary battery, wherein the positive electrode is formed from a positive electrode catalyst comprising a Ruddlesden-Popper type layered perovskite represented by the following formula (2):

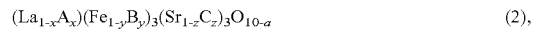

wherein in the formula (2), A is a rare earth element other than La, B is a transition metal other than Fe, and C is an alkaline earth metal other than Sr; and x satisfies an expression: $0 \leq x < 1$, y satisfies an expression: $0 \leq y < 1$, z satisfies an expression: $0 \leq z < 1$, and a satisfies an expression $0 \leq a \leq 3$.

2. The device according to claim 1, wherein the negative electrode comprises a negative electrode active material comprising an element selected from the group consisting of an alkaline metal, an alkaline earth metal, a first-row transition metal and Al.

3. The device according to claim 1, wherein a reaction represented by the following formula (1) occurs on a side of the positive electrode, $$4OH^- \rightarrow O_2 + 2H_2O + 4e^- \tag{1}$$

* * * * *